(12) United States Patent
Yanagida et al.

(10) Patent No.: US 10,964,989 B2
(45) Date of Patent: Mar. 30, 2021

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

(72) Inventors: Taiji Yanagida, Mie (JP); Shinichi Takase, Mie (JP); Yasuhiko Kotera, Mie (JP); Yoshiaki Kuroyanagi, Mie (JP); Koichi Tanaka, Aichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 330 days.

(21) Appl. No.: 16/248,350

(22) Filed: Jan. 15, 2019

(65) Prior Publication Data
US 2019/0221815 A1    Jul. 18, 2019

(30) Foreign Application Priority Data
Jan. 16, 2018   (JP) .............................. JP2018-004939

(51) Int. Cl.
*H01M 2/20*   (2006.01)
*H01M 2/30*   (2006.01)
(Continued)

(52) U.S. Cl.
CPC ....... *H01M 50/502* (2021.01); *H01M 10/482* (2013.01); *H01M 50/20* (2021.01);
(Continued)

(58) Field of Classification Search
None
See application file for complete search history.

(56) References Cited

U.S. PATENT DOCUMENTS

| 6,261,719 B1 | 7/2001 | Ikeda et al. |
| 2014/0154551 A1* | 6/2014 | Nakayama ............. B60L 50/64 429/121 |

(Continued)

FOREIGN PATENT DOCUMENTS

JP          2000-149909          5/2000

*Primary Examiner* — Christopher P Domone
(74) *Attorney, Agent, or Firm* — Greenblum & Bernstein, P.L.C.

(57) ABSTRACT

A connection module to be assembled to a power storage element stack including power storage element arrays in each of which power storage elements including electrode terminals of a positive electrode and a negative electrode are arranged. The connection module includes: a plurality of bus bars that electrically connects the electrode terminals between the adjacent power storage elements; a plurality of bus bar housing parts each housing each of the bus bars; a plurality of first hinge linking parts that links the bus bar housing parts and expands and contracts in a direction where the power storage elements are arranged; a plurality of inter-array bus bars that electrically connects the electrode terminals of power storage element arrays; a plurality of inter-array bus bar housing parts each housing each of the inter-array bus bars; and angle adjusting part adjusting an inclination angle of each of the inter-array bus bar housing part.

9 Claims, 9 Drawing Sheets

(51) Int. Cl.
  *H01M 2/26*    (2006.01)
  *H01M 50/502*  (2021.01)
  *H01M 10/48*   (2006.01)
  *H01M 50/20*   (2021.01)
  *H01M 50/531*  (2021.01)
  *H01M 50/543*  (2021.01)

(52) U.S. Cl.
  CPC ....... *H01M 50/531* (2021.01); *H01M 50/543* (2021.01); *H01M 2220/20* (2013.01)

(56) References Cited

U.S. PATENT DOCUMENTS

| | | | |
|---|---|---|---|
| 2014/0238723 A1* | 8/2014 | Ogasawara | H01M 50/20 174/135 |
| 2014/0315441 A1* | 10/2014 | Kinoshita | H01M 10/48 439/627 |
| 2019/0288265 A1* | 9/2019 | Jeon | H01M 50/572 |

\* cited by examiner

CONNECTION MODULE

CROSS REFERENCE TO RELATED APPLICATION

This application claims priority from Japanese Patent Application No. 2018-004939 filed on Jan. 16, 2018. The entire contents of the priority application are incorporated herein by reference.

TECHNICAL FIELD

The technology described herein relates to a connection module, and specifically to a connection module that is assembled to a power storage element stack including a plurality of power storage element arrays in each of which power storage elements each including positive electrodes and negative electrodes are arranged.

BACKGROUND

In a power storage module for a vehicle such as an electric vehicle or a hybrid vehicle, a plurality of power storage elements including electrode terminals of a positive electrode and a negative electrode is arranged. In this arrangement, the electrode terminals of the adjacent power storage elements are connected through a bus bar included in a connection module; thus, the plurality of power storage elements is connected in series or in parallel. In general, the distance between the electrodes of the adjacent power storage elements (electrode pitch) varies. In one technology made in view of this variation, the connection module includes pitch adjusting means that expands and contracts the connection module in a direction where the power storage elements are arranged so as to adjust the electrode pitch, that is to say, absorbs the tolerance of the electrode pitch (for example, see Japanese Unexamined Patent Application Publication No. 2000-149909).

In the recent power storage modules, however, a plurality of, for example two, power storage element arrays each including a plurality of power storage elements may be provided because of the relation of the output voltage or the like. In this case, due to the pitch adjusting means that absorbs the pitch tolerance or the accumulated tolerance in each power storage element array, for example, displacement occurs between the power storage element arrays in the direction where the power storage elements are arranged. In the occurrence of the displacement between the power storage element arrays, the efficiency of the work of connecting the electrode terminals between the power storage element arrays deteriorates. Therefore, a connection module in which, even if the displacement occurs between the power storage element arrays in the direction where the power storage elements are arranged, the displacement between the power storage element arrays is absorbed has been desired.

SUMMARY

The technology described herein was made in view of the above circumstances. An object is to provide a connection module that is assembled to a power storage element stack formed by a plurality of power storage element arrays, in which the displacement between the power storage element arrays in a direction where power storage elements are arranged can be absorbed.

A connection module disclosed in the present specification is a connection module to be assembled to a power storage element stack including a plurality of power storage element arrays in each of which power storage elements each including positive electrodes and negative electrodes are arranged, the connection module including: a plurality of bus bars that electrically connects the electrode terminals between the power storage elements that are adjacent in each of the power storage element arrays; a plurality of bus bar housing parts each housing each of the bus bars; a plurality of first hinge linking parts that links the bus bar housing parts in a direction where the power storage elements are arranged, and expands and contracts in the direction where the power storage elements are arranged; a plurality of inter-array bus bars that electrically connects an electrode terminal of one power storage element array and an electrode terminal of another power storage element array;
a plurality of inter-array bus bar housing parts each housing each of the inter-array bus bars; and an angle adjusting part adjusting an inclination angle of each of the inter-array bus bar housing parts from a direction perpendicular to the direction where the power storage elements are arranged in a plan view.

The present configuration includes the angle adjusting parts each adjusting the inclination angle of each inter-array bus bar housing part from the direction perpendicular to the direction where the power storage elements are arranged in a plan view. Therefore, even if the displacement occurs between the power storage element arrays in the direction where the power storage elements are arranged due to the accumulated tolerance in the power storage element arrays in the direction where the-power storage elements are arranged, the displacement between the power storage element arrays can be absorbed by adjusting the inclination angle of the inter-array bus bar housing part by the angle adjusting parts. Thus, a predetermined number of power storage elements can be connected in series in accordance with the accumulated tolerance of each of the plurality of power storage element arrays. That is to say, in the connection module with the present configuration that is assembled to the power storage element stack including the plurality of power storage element arrays, the displacement between the power storage element arrays in the direction where the power storage elements are arranged can be absorbed.

In the above connection module, the angle adjusting part may include a plurality of flexible ribs coupling the bus bar housing parts and the inter-array bus bar housing parts in the direction perpendicular to the direction where the power storage elements are arranged, or coupling one inter-array bus bar housing part and another inter-array bus bar housing part in the direction perpendicular to the direction where the power storage elements are arranged.

In the present configuration, by forming the angle adjusting parts with the flexible ribs, the angle adjusting parts can be achieved by a simple configuration.

In addition, in the connection module, each of the flexible ribs may be provided at a position corresponding to a virtual line connecting the electrode terminal of the positive electrode and the electrode terminal of the negative electrode in one of the power storage elements.

In the present configuration, the flexible rib is disposed at a position connecting the electrode terminal of the positive electrode and the electrode terminal of the negative electrode in the same power storage element above the power storage element. That is to say, the flexible rib is disposed on a central line in the direction vertical to the direction where the power storage elements are arranged above the power storage element. Therefore, the present configuration can deal most effectively with the accumulated tolerance in the direction where the power storage elements are arranged in the power storage element array. That is to say, the present configuration can deal uniformly with the displacement in opposite directions along the direction where the power storage elements are arranged in the power storage element arrays.

In the above connection module, the angle adjusting part may further include a plurality of second hinge linking parts that alternately links one end and another end of two adjacent inter-array bus bar housing parts in the direction perpendicular to the direction where the power storage elements are arranged.

By the present configuration, in the case where the power of the flexible rib to hold the inter-array bus bar housing part is weak, the holding power can be reinforced by the second hinge linking part. Therefore, the work of assembling the connection module to the power storage element stack can be improved.

The above connection module may further include grip parts that are provided at both ends in the direction where the power storage elements are arranged and that grip the connection module to expand and contract the first hinge linking parts and adjust the angle adjusting part.

In the present configuration, when the connection module is assembled to the power storage element stack, the first hinge linking parts are expanded and contracted to adjust the angle adjusting part, and moreover, the assembling work can be improved by the grip part.

The above connection module may further include rigid parts that are provided at both ends in the direction where the power storage elements are arranged, that include the grip parts, and that transmit an expansion and contraction force to the first hinge linking parts.

In the present configuration, the expansion and contraction force can be transmitted to the first hinge linking parts through the rigid parts. Therefore, the displacement can be absorbed and the work of assembling the connection module to the power storage element stack can be performed efficiently.

In the above connection module, at least a grip part on one end may include a wall part that forms a routing groove routing a detection line that detects a state of the power storage element, and a lid part that covers the routing groove.

In the present configuration, the grip part can also serve as the routing groove for the detection line, and thus, the size of the connection module can be reduced.

The above connection module may further include a flexible linking rib that links two adjacent flexible ribs.

In the present configuration, in the case where the power of the flexible rib to hold the inter-array bus bar housing part is weak, the holding power of the flexible rib is reinforced by the flexible linking rib.

In any of the above connection modules, the angle adjusting part may be formed to be integrated with each of the inter-array bus bar housing parts.

In the present configuration, the angle adjusting parts can be formed easily by being integrated with the inter-array bus bar housing parts.

In the connection module according to the technology described herein that is assembled to the power storage element stack including the plurality of power storage element arrays, the displacement between the power storage element arrays in the direction where the power storage elements are arranged can be absorbed by a simple configuration.

DETAILED DESCRIPTION

Embodiment

One embodiment will be described with reference to FIG. 1 to FIG. 10. In the description below, a plurality of members that is the same may be denoted by one reference sign and the reference signs and description of the other members may be omitted.

1. Power Storage Module

Figure 1:
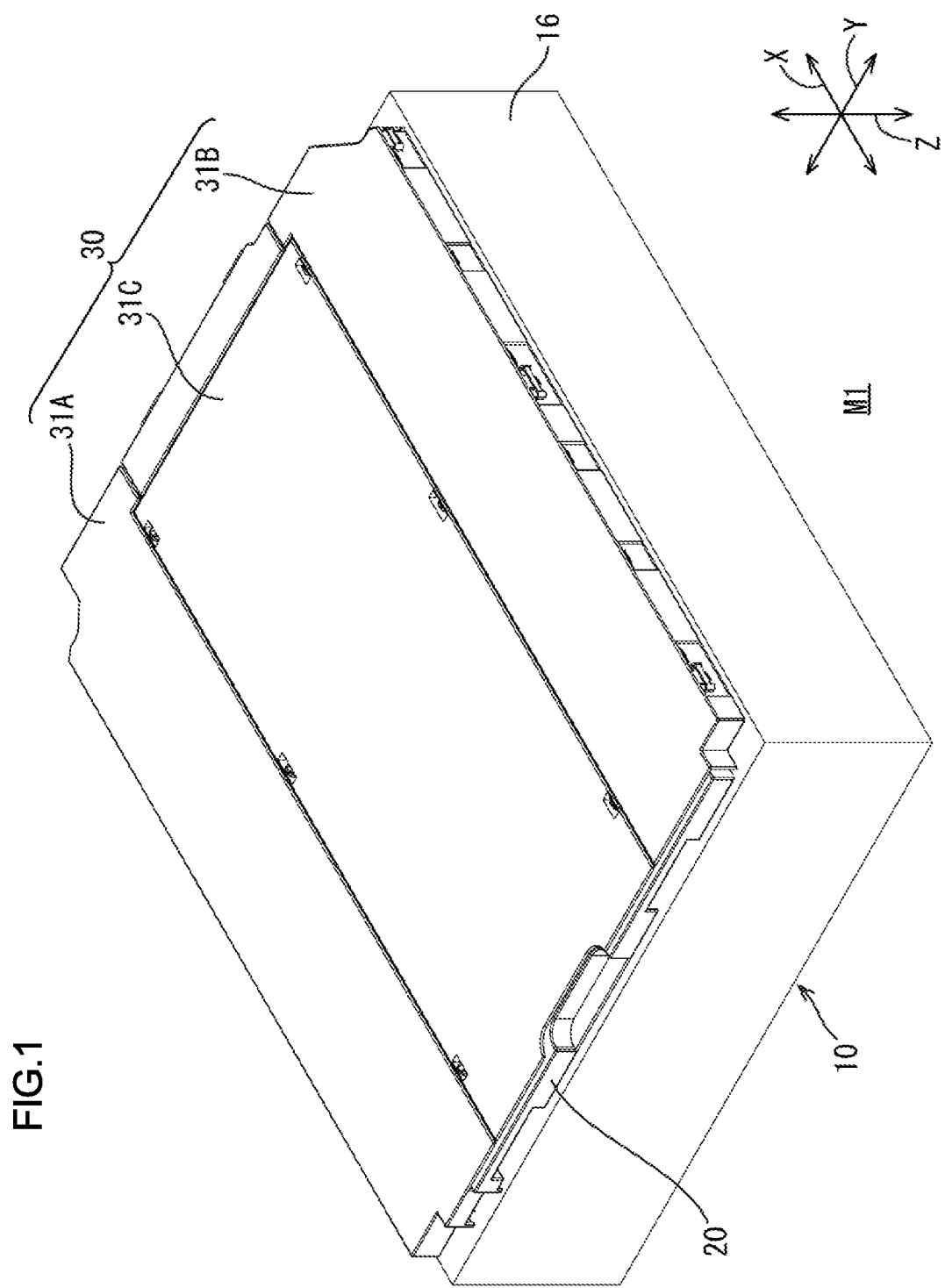
FIG. 1 is a perspective view of a power storage module including a connection module according to one embodiment.
Figure 2:
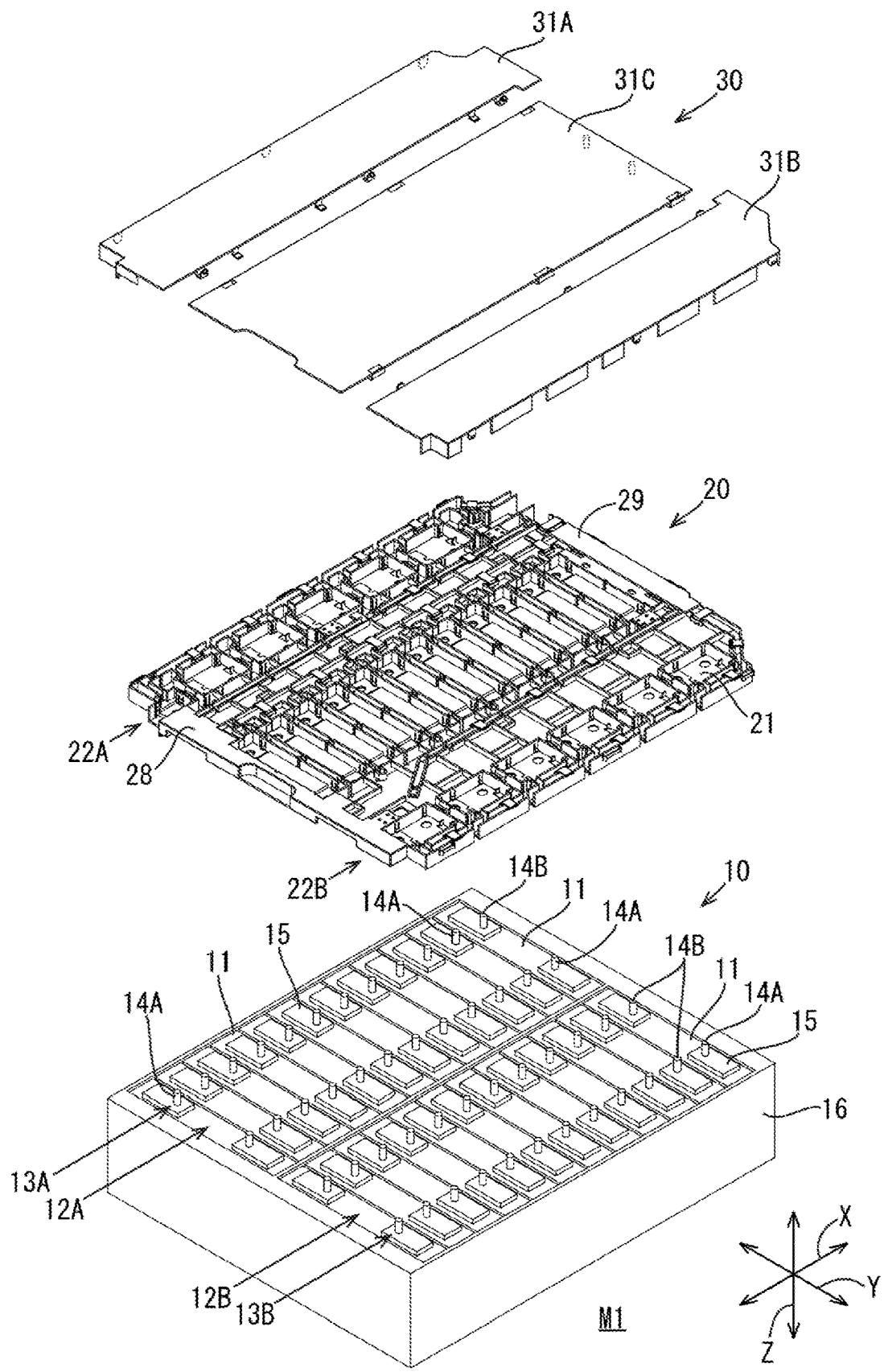
FIG. 2 is an exploded perspective view of the power storage module.

A power storage module M1 includes a power storage element stack 10, a connection module 20, and a connection module cover 30 as illustrated in FIG. 2. The power storage module M1 is used as, for example, a driving source of a vehicle such as an electric vehicle or a hybrid vehicle. In the power storage module M1 illustrated in FIG. 1, an arrow X indicates a direction (left-right direction) where power storage elements 11 are arranged, an arrow Y indicates a direction (front-back direction) vertical to the direction where the power storage elements 11 are arranged, and an arrow Z indicates an up-down direction.

2. Power Storage Element Stack

The power storage element stack 10 includes a plurality of power storage element arrays each including a plurality of (twelve in the present embodiment) power storage elements 11. In the present embodiment, the power storage element stack 10 includes two power storage element arrays: a first power storage element array 12A and a second power storage element array 12B as illustrated in FIG. 2. The number of power storage element arrays is not limited to two, and may be, for example, three or four.

The first power storage element array 12A includes a first electrode terminal array 13A positioned at one end (rear end) of the power storage element stack 10 in a direction (arrow-Y direction in FIG. 2) that is vertical to the direction (arrow-X direction in FIG. 2) where the power storage elements 11 are arranged. In addition, the second power storage element array 12B includes a second electrode terminal array 13B positioned at the other end (front end) of the power storage element stack 10 in the direction that is vertical to the direction where the power storage elements 11 are arranged. Note that the first power storage element array 12A and the second power storage element array 12B are hereinafter simply referred to as the power storage element array 12 unless they need to be distinguished. Moreover, the first electrode terminal array 13A and the second electrode terminal array 13B are hereinafter simply referred to as the electrode terminal array 13 unless they need to be distinguished.

Each power storage element 11 includes a positive electrode terminal 14A and a negative electrode terminal 14B that project vertically from an upper surface of a main body part with a flat rectangular parallelepiped shape in which a power storage component that is not shown is housed. Note that the positive electrode and the negative electrode are hereinafter simply referred to as the electrode terminal 14 unless they need to be distinguished.

To each electrode terminal 14, a terminal insertion hole 21H (see FIG. 4) for the bus bar 21 is formed. To a side wall part of the electrode terminal 14, a screw thread (not shown) to which a nut is fitted is formed.

When the bus bar 21 inserted in the electrode terminal 14 and a terminal board 15 are brought into contact with each other, the bus bar 21 and the electrode terminal 14 are electrically connected. In each power storage element array, the plurality of power storage elements 11 is disposed such that the electrode terminals 14 adjacent in the left-right direction (arrow-X direction) in FIG. 2 have opposite polarities. In regard to the first power storage element array 12A and the second power storage element array 12B, the power storage elements 11 are arranged such that the electrode terminals 14 adjacent in the front-back direction (arrow-Y direction) in FIG. 2 have opposite polarities.

In the power storage element stack 10, the first and second power storage element arrays (12A, 12B) are housed in a housing box 16.

3. Connection Module

Figure 3:
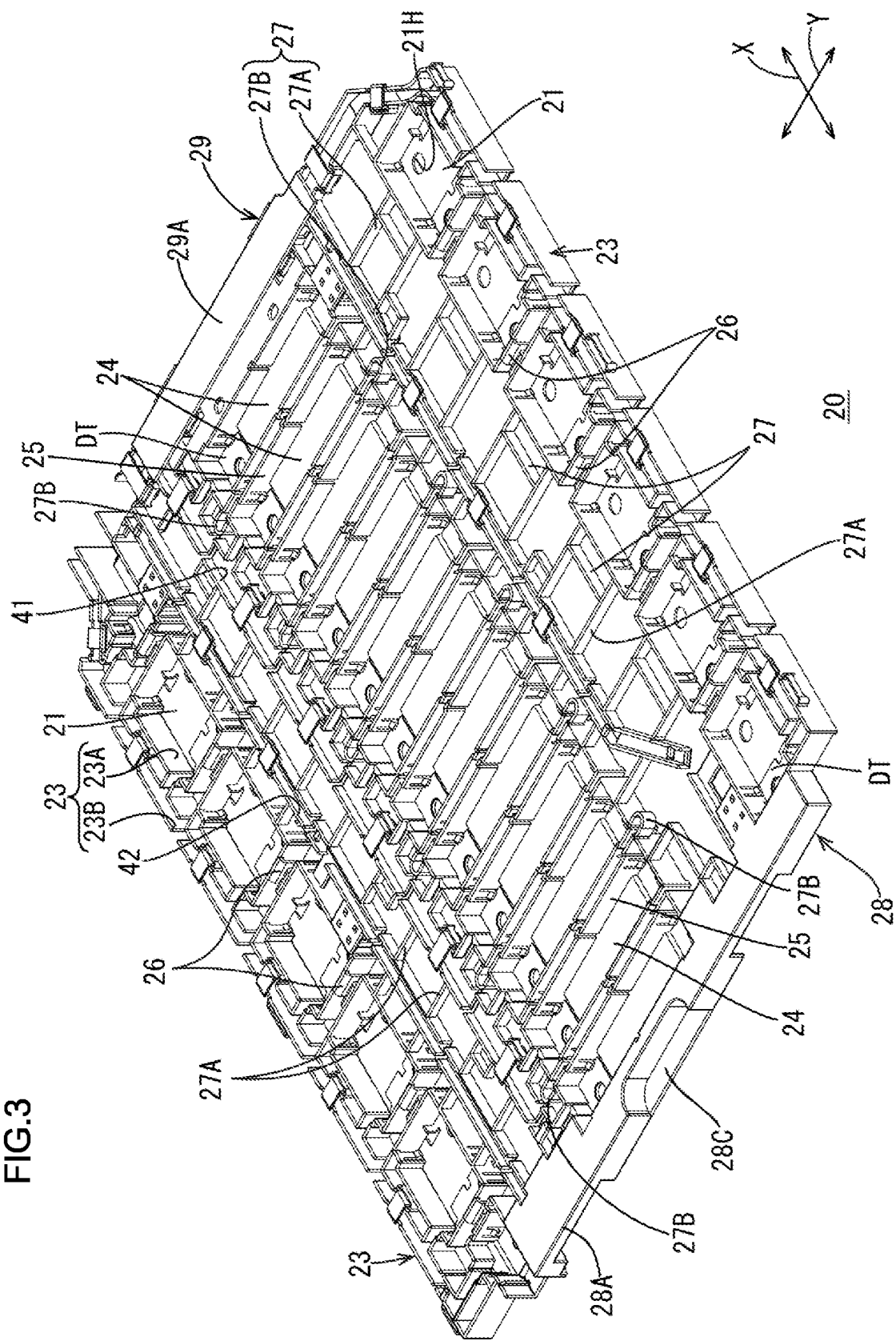
FIG. 3 is a perspective view of the connection module according to the embodiment.
Figure 4:
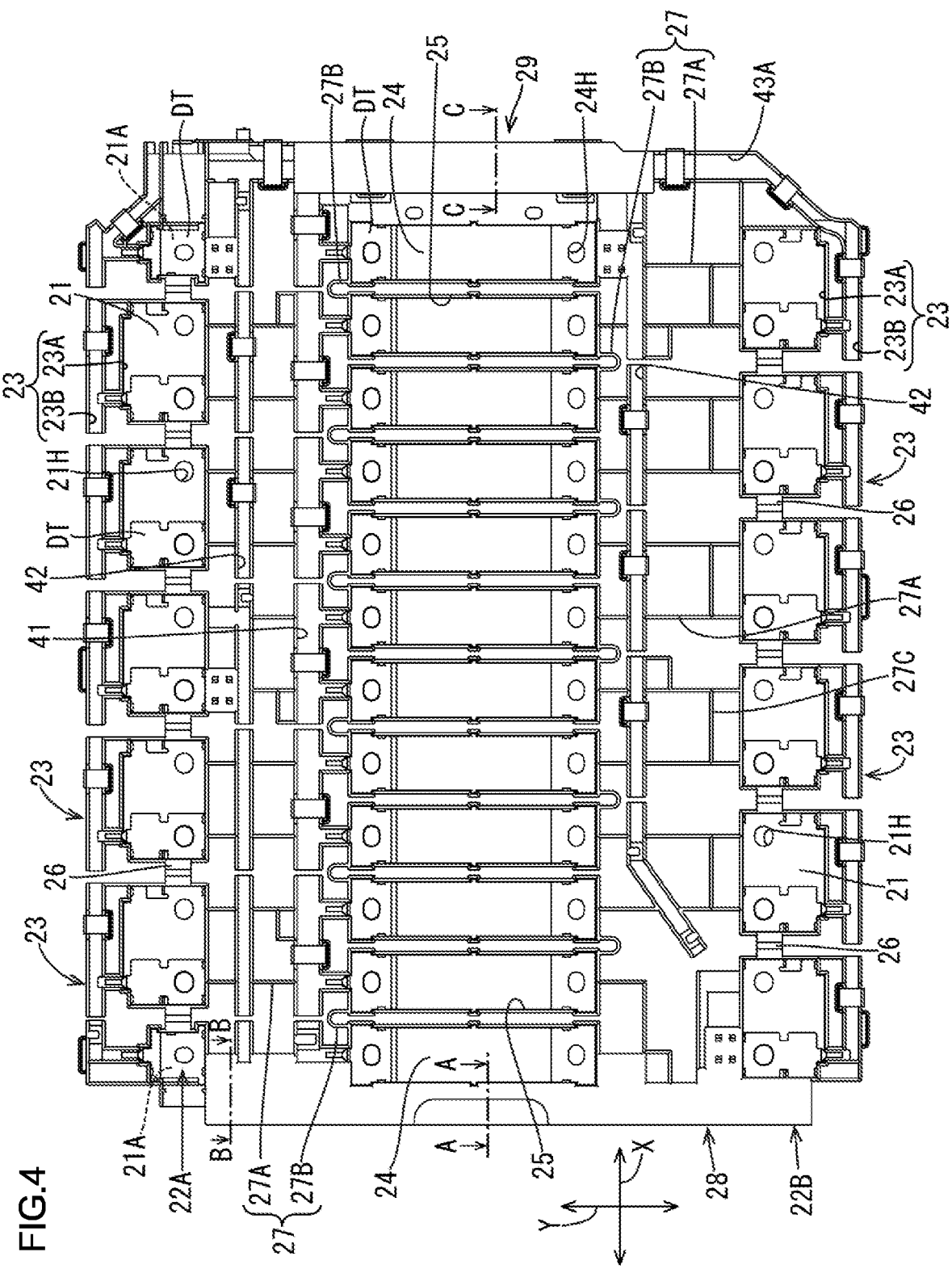
FIG. 4 is a plan view of the connection module.

As illustrated in FIG. 3 and FIG. 4, the connection module 20 includes a plurality of bus bars 21, a plurality of bus bar holding units 23, a plurality of inter-array bus bars 24, a plurality of inter-array bus bar housing parts 25, first hinge linking parts 26, angle adjusting parts 27, grip parts (28, 29), inter-array detection line routing parts 41, and the like. Except metal parts of the connection module 20, such as the bus bars 21 and the inter-array bus bars 24, the components of the connection module 20 are integrally formed by injection molding of polypropylene (PP) as the thermoplastic resin (see FIG. 5), for example.

Each bus bar 21 electrically connects between the electrode terminals 14 of the power storage element arrays 12. The plurality of bus bars 21 includes a first bus bar array 22A for the first electrode terminal array 13A of the first power storage element array 12A, and a second bus bar array 22B for the second electrode terminal array 13B of the second power storage element array 12B.

Each bus bar 21 is formed of metal such as copper, copper alloy, stainless steel (SUS), or aluminum, and has a plate shape with the length in accordance with the distance between the adjacent electrode terminals 14 and 14 (electrode pitch). To each of the bus bars 21 other than the bus bars 21A at both upper end parts in FIG. 4, a pair of terminal insertion holes 21H through which the electrode terminals 14 are inserted is formed to penetrate. Note that to each of the bus bars 21A at both upper end parts in FIG. 4, only one terminal insertion hole 21H is formed to penetrate. The shape of the terminal insertion hole 21H is an oval shape that is long in the direction (arrow-X direction) where the power storage elements 11 are arranged, so that it is possible to deal with the tolerance in the pitch between the electrode terminals.

Each bus bar holding unit 23 includes a bus bar housing part 23A and a detection line routing part 23B.

The bus bar housing part 23A houses the bus bar 21, a detection terminal DT for detecting the voltage of the power storage element 11, and the like. The detection terminal DT is connected to the bus bar 21 through the penetration hole in the bus bar housing part 23A. A detection line that is not shown is connected to one end of the detection terminal DT, and the detection line is connected to a controller (not shown) on the outside through the detection line routing part 23B.

The first hinge linking part 26 is provided between two bus bar housing parts 23A that are adjacent to link the bus bar housing parts 23A in the direction where the power storage elements are arranged (arrow-X direction in FIG. 4), and expands and contracts in the direction where the power storage elements are arranged. Each of the first hinge linking parts 26 is integrated with the bus bar holding unit 23.

Each inter-array bus bar 24 electrically connects the electrode terminal of the first power storage element array 12A (corresponding to one power storage element array) and the electrode terminal of the second power storage element array 12B (corresponding to another power storage element array) that are arrayed in the arrow-Y direction in FIG. 2. For example, at a right end in the arrow-X direction in FIG. 2, the inter-array bus bar 24 electrically connects the positive electrode terminal 14A of the first power storage element array 12A and the negative electrode terminal 14B of the second power storage element array 12B.

The inter-array bus bars 24 are formed of a material similar to that of the bus bars 21, and to each inter-array bus bar 24, a pair of terminal insertion holes 24H is formed to penetrate. Through the terminal insertion holes 24H, the electrode terminals 14 are inserted. The shape of the terminal insertion hole 24H is an oval shape that is long in the direction (arrow-X direction) where the power storage elements 11 are arranged, so that it is possible to deal with the displacement between the power storage element arrays due to the accumulated tolerance of the power storage element arrays.

Each inter-array bus bar housing part 25 houses the inter-array bus bar 24, the detection terminal DT for detecting the voltage between the arrays, that is, the voltage of the inter-array bus bar 24, and the like. The detection terminal DT is connected to the inter-array bus bar 24 through the penetration hole in the inter-array bus bar housing part 25. To one end of the detection terminal DT, the inter-array detection line that is not shown is connected. The inter-array detection line is connected to an external control unit (not shown) through the inter-array detection line routing part 41.

The angle adjusting part 27 adjusts an inclination angle $\theta$ of each inter-array bus bar housing part 25 from a direction (arrow-Y direction in FIG. 4) that is perpendicular to the direction where the power storage elements are arranged in a plan view. The inclination angle $\theta$ is the inclination angle of the inter-array bus bar housing part 25 relative to the arrow-Y direction as illustrated in FIG. 7. If there is no displacement in stacking tolerance of the power storage elements 11 between the first power storage element array 12A and the second power storage element array 12B, the inclination angle $\theta$ is zero as illustrated in FIG. 6.

However, if there is the displacement due to the stacking tolerance, the inclination angle $\theta$ is formed in each inter-array bus bar housing part 25 as illustrated in FIG. 7 by the action of the angle adjusting part 27 to absorb the displacement due to the stacking tolerance. In other words, even if there is the displacement due to the stacking tolerance of the power storage elements 11 in the first power storage element array 12A and the second power storage element array 12B, the inclination angle θ is formed in each inter-array bus bar housing part 25 by the angle adjusting part 27; thus, the displacement due to the stacking tolerance is absorbed. Accordingly, even if the displacement occurs between the power storage element arrays, the inter-array bus bar 24 can be easily connected to the electrode terminals between the power storage element arrays.

In FIG. 7, the right side in the arrow-Y direction (second bus bar array 22B side) is expanded by the angle adjusting part 27 as indicated by an arrow E and the left side in the arrow-Y direction (first bus bar array 22A side) is contracted by the angle adjusting part 27 as indicated by an arrow S.

Figure 6:
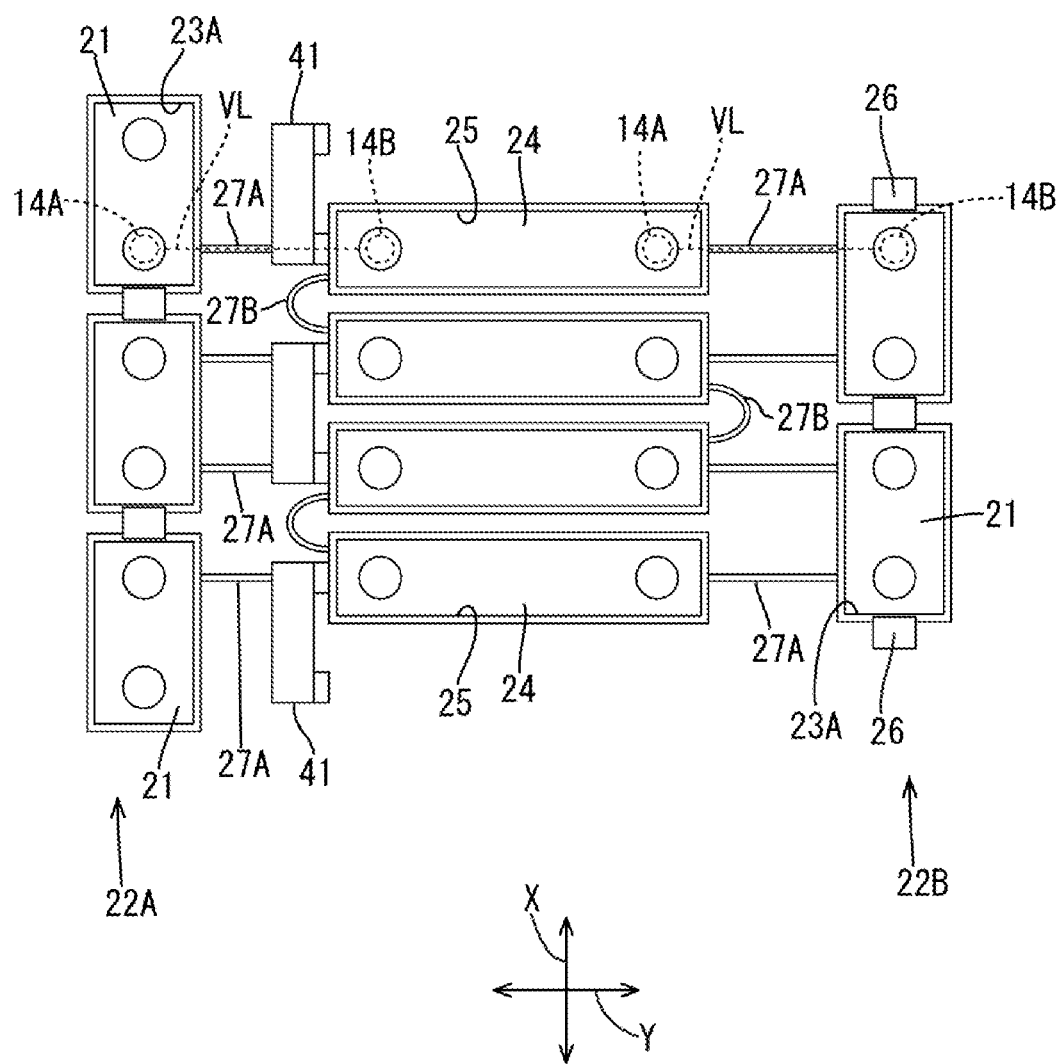
FIG. 6 is a schematic plan view illustrating a state in which an angle adjusting part is not expanded or contracted.
Figure 7:
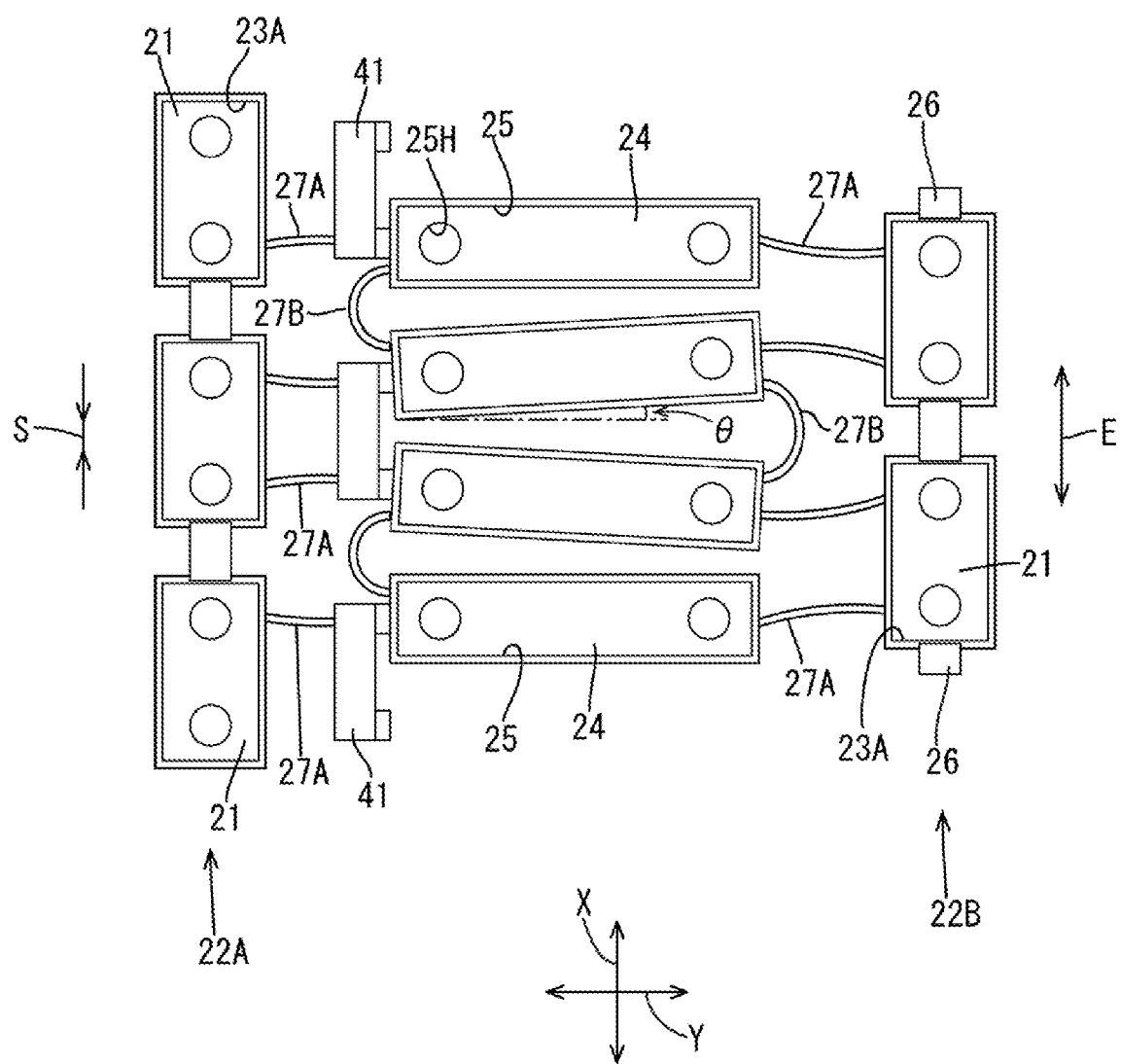
FIG. 7 is a schematic plan view illustrating a state in which an angle adjusting part is expanded and contracted.

In the present embodiment, the angle adjusting parts 27 include a plurality of flexible ribs 27A and a plurality of second hinge linking parts 27B as illustrated in FIG. 6 and FIG. 7. The angle adjusting part 27 is formed to be integrated with the inter-array bus bar housing part 25. Therefore, the angle adjusting part 27 can be formed easily.

Each flexible rib 27A couples the bus bar housing part 23A and the inter-array bus bar housing part 25 in the direction (arrow-Y direction in FIG. 6) that is perpendicular to the direction where the power storage elements are arranged (arrow-X direction in FIG. 6). Each flexible rib 27A is provided at a position in accordance with a virtual line VL connecting the positive electrode terminal 14A and the negative electrode terminal 14B in the same power storage element as illustrated in FIG. 6. That is to say, the flexible rib 27A is disposed on a central line above the power storage element 11 in the direction perpendicular to the direction where the power storage elements are arranged. Therefore, it is possible to deal with the accumulated tolerance in the direction where the power storage elements are arranged in the power storage element arrays 12 most effectively. That is to say, it is possible to uniformly deal with the displacement in opposite directions (both directions indicated by arrow X) where the power storage elements are arranged in the power storage element arrays 12.

In a case where three or more power storage element arrays 12 are provided, the flexible ribs 27A may couple one inter-array bus bar housing part 25 and another inter-array bus bar housing part 25 in the perpendicular direction (arrow-Y direction in FIG. 6).

As illustrated in FIG. 3, etc., between the two flexible ribs 27A that are adjacent, a flexible linking rib 27C that links the two flexible ribs 27A is provided. Therefore, in the case where the power of the flexible rib 27A to hold the inter-array bus bar housing part 25 is weak, the holding power of the flexible rib is reinforced by the flexible linking rib 27C.

Each second hinge linking part 27B alternately links one end part and the other end part of the two adjacent inter-array bus bar housing parts 25 in the direction (arrow-Y direction in FIG. 6) perpendicular to the direction where the power storage elements are arranged as illustrated in FIG. 6. In the case where the power of the flexible rib 27A to hold the inter-array bus bar housing part 25 is weak, the holding power can be reinforced by the second hinge linking part 27B. Therefore, the work of assembling the connection module 20 to the power storage element stack 10 can be improved.

The grip parts (28, 29) are provided at both ends of the connection module 20 in the direction (arrow-X direction in FIG. 4) where the power storage elements are arranged as illustrated in FIG. 4.

Figure 8:
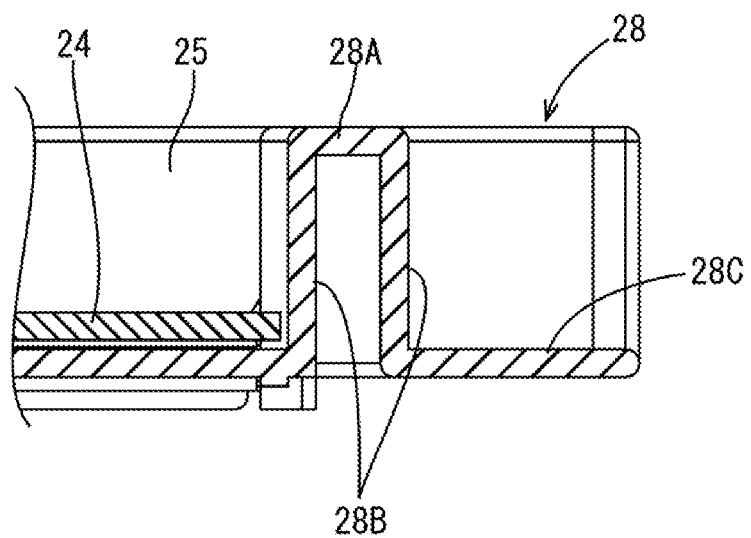
FIG. 8 is a cross-sectional view of a grip part taken along line A-A in FIG. 4.
Figure 9:
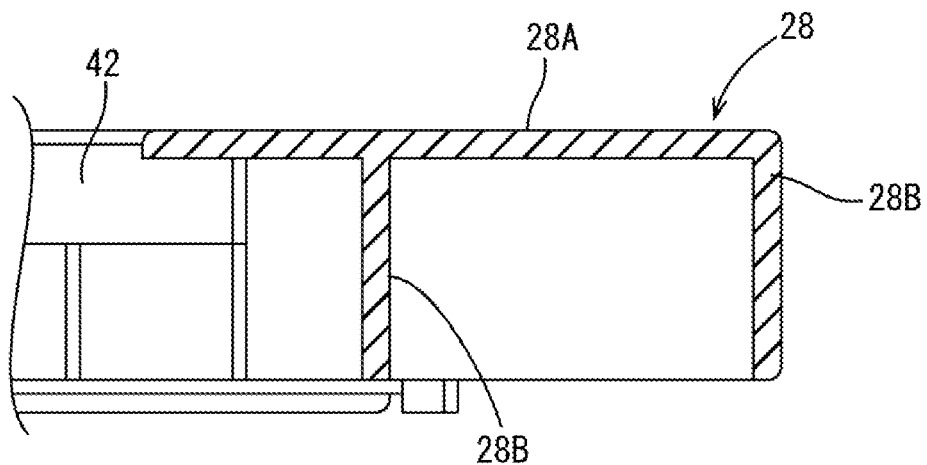
FIG. 9 is a cross-sectional view of the grip part taken along line B-B in FIG. 4.

The grip part 28 is provided at a left end in the arrow-X direction in FIG. 4 and includes a ceiling plate part 28A, a sidewall part 28B, central grip plate part 28C, and the like (see FIG. 3, FIG. 8, and FIG. 9). By such a structure, the grip part 28 forms a rigid configuration.

Figure 5:
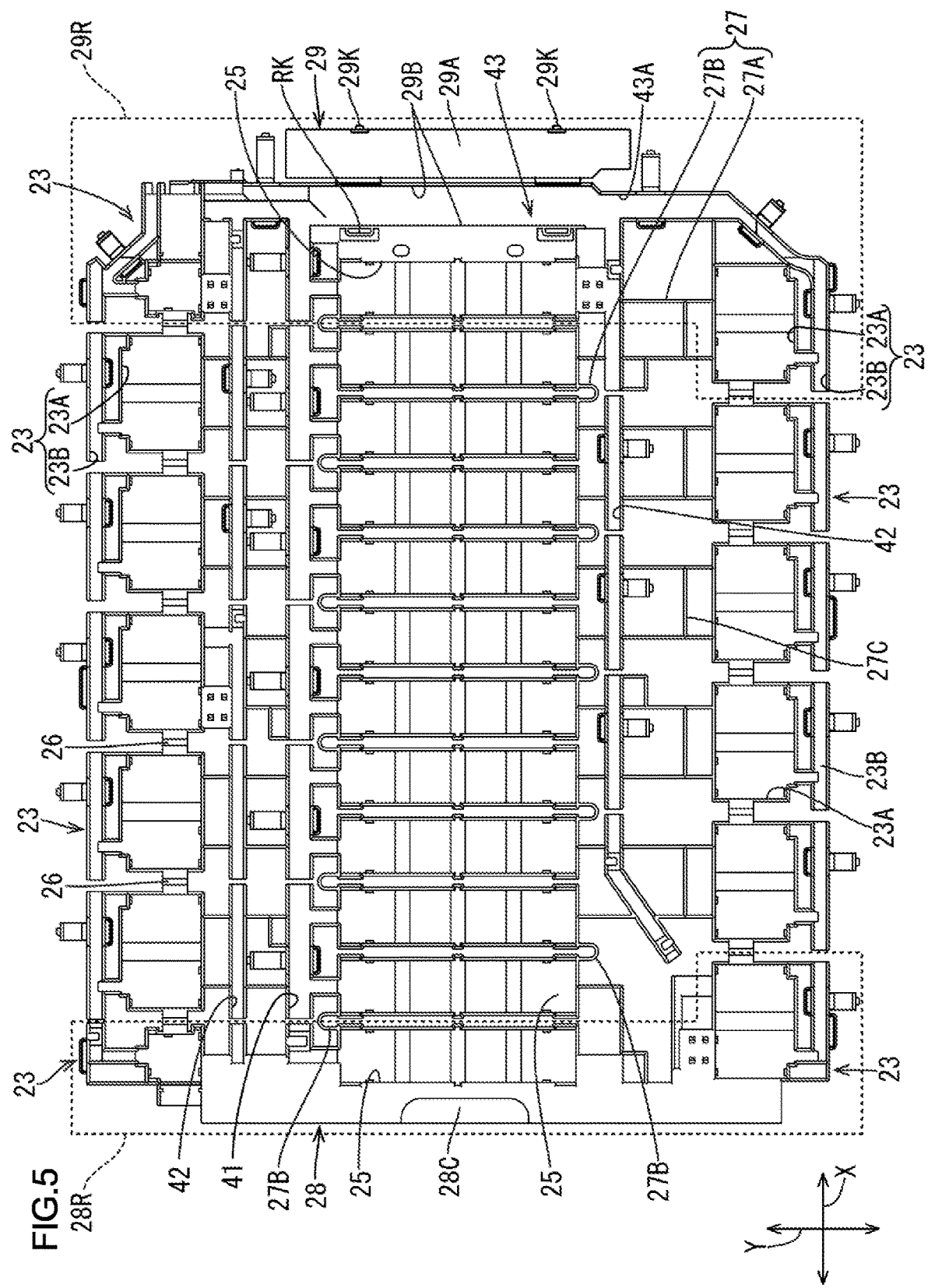
FIG. 5 is a plan view of the connection module without a bus bar.
Figure 10:
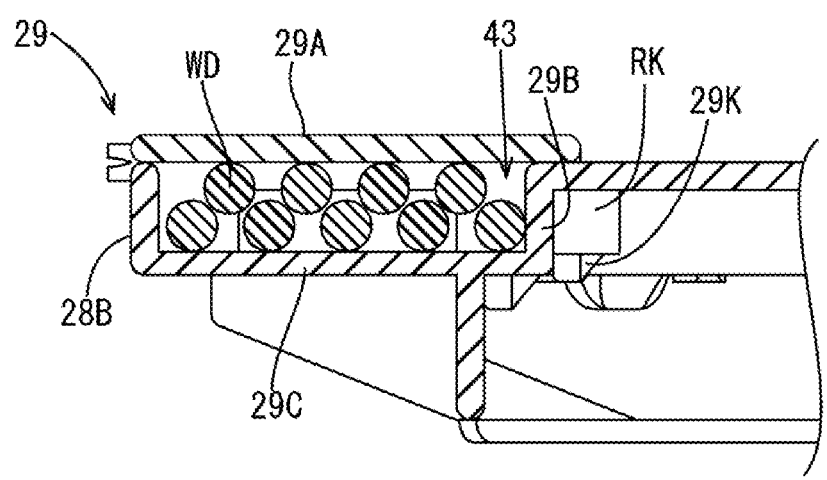
FIG. 10 is a cross-sectional view of the grip part taken along line C-C in FIG. 4.

In addition, the grip part 29 is provided at a right end in the arrow-X direction in FIG. 4 and includes a lid part 29A, the sidewall part 28B, a bottom plate part 29C, an engaging part 29K, and the like as illustrated in FIG. 5 and FIG. 10. By such a structure, the grip part 29 forms a rigid configuration.

The sidewall part 28B (one example of wall part) and the bottom plate part 29C (one example of wall part) form a routing groove 43 that routes a detection line WD for detecting the state of the power storage element 11, and the lid part 29A covers the routing groove 43 (see FIG. 10). In the present embodiment, the grip part 29 can also serve as the routing groove 43 for the detection line WD, and thus, the size of the connection module 20 can be reduced.

The engaging part 29K is engaged with an engaged part RK when the lid part 29A is closed (see FIG. 10).

At both ends of the connection module 20 in the direction (arrow-X direction) where the power storage elements are arranged, rigid parts (28R, 29R) that include the grip parts (28, 29) and transmit an expansion and contraction force to the first hinge linking parts are formed as illustrated in FIG. 5.

Here, for example, the rigid part 28R includes the grip part 28, the bus bar holding units 23 that are disposed in the upper and lower parts in the arrow-Y direction at the left end in the arrow-X direction, the inter-array bus bar housing part 25, and the like as shown within a dotted frame at the left end in the arrow-X direction in FIG. 5. On the other hand, for example, the rigid part 29R includes the grip part 29, the bus bar holding units 23 that are disposed in the upper and lower parts in the arrow-Y direction at the right end in the arrow-X direction, the inter-array bus bar housing part 25, and the like as shown within a dotted frame at the right end in the arrow-X direction in FIG. 5.

With these rigid parts (28R, 29R), the expansion and contraction force can be properly transmitted to the first hinge linking parts 26 when the connection module 20 is assembled to the power storage element stack 10. Accordingly, the displacement between the power storage element arrays can be absorbed for sure and the assembling work can be made efficient. The configuration of each rigid part (28R, 29R) is not limited to the present configuration.

4. Connection Module Cover

The connection module cover 30 is a cover that is attached to the upper part of the connection module 20, and includes three split cover parts: a first cover part 31A, a second cover part 31B, and a central cover part 31C as illustrated in FIG. 2 and FIG. 3. In the present embodiment, the connection module cover 30 has a shape that covers the entire upper part of the connection module 20 as illustrated in FIG. 1 and FIG. 2. In this manner, since the connection module cover 30 has the configuration of covering the entire upper part of the connection module 20, a live part of the connection module 20 such as the bus bar 21 can be protected.

5. Method of Assembling the Connection Module to the Power Storage Element Stack Next, description is made of a method of assembling the connection module 20 to the power storage element stack 10. This method is one example, and other methods may be employed.

First, as illustrated in FIG. 2, the power storage element stack 10 in which the first power storage element array 12A and the second power storage element array 12B are housed in the housing box 16 is prepared.

Next, the connection module 20 is assembled to the surface of the power storage element stack 10 where the electrode terminal 14 of each power storage element 11 is formed. In this assembling, while the grip parts (28H, 29H) at both ends of the connection module 20 are gripped, the electrode terminals 14 are inserted into the terminal insertion holes 21H of the bus bars 21 and the terminal insertion holes 24H of the inter-array bus bars 24 in the order from one end of the power storage element stack 10, for example, from the right end in FIG. 2.

When the electrode terminals 14 are inserted into the terminal insertion holes (21H, 24H), the first hinge linking parts 26 are expanded and contracted to adjust the angle adjusting parts 27 as illustrated in FIG. 7 by the grip parts (28, 29) and the rigid parts (28R, 29R) at both ends of the connection module 20. Specifically, the second hinge linking parts 27B are expanded and contracted and at the same time, the flexible ribs 27A are warped; thus, the inclination angle θ of the inter-array bus bar housing parts 25 is adjusted. Thus, the electrode terminals 14 can be inserted into the terminal insertion holes (21H, 24H). That is to say, even if there is the stacking tolerance of the power storage elements that is different in the first power storage element array 12A and the second power storage element array 12B and the displacement occurs between the power storage element arrays, a predetermined number of power storage elements can be connected in series in accordance with the stacking tolerance.

Next, a nut is attached to each electrode terminal 14; thus, the connection module 20 can be assembled to the power storage element stack 10. Furthermore, the detection terminal DT with the detection line 42 connected thereto is attached to a predetermined electrode terminal 14, and the detection line 42 is routed by the detection line routing part 23B or the inter-array detection line routing part 41.

6. Effects of the Present Embodiment

In the present embodiment, the angle adjusting part 27 (27A, 27B) is provided to adjust the inclination angle θ (see FIG. 5) of each inter-array bus bar housing part 25 from the direction (arrow-Y direction in FIG. 4) that is perpendicular to the direction where the power storage elements are arranged in a plan view. Therefore, even if the displacement in the direction where the power storage elements are arranged occurs between the power storage element arrays due to the accumulated tolerance in the power storage element arrays (12A, 12B) in the direction where the power storage elements are arranged (arrow-X direction in FIG. 4), the displacement between the power storage element arrays can be absorbed by adjusting the inclination angle θ of the inter-array bus bar housing part by the angle adjusting part (27A, 27B). Thus, a predetermined number of power storage elements can be connected in series in accordance with the accumulated tolerance in each of the plurality of power storage element arrays. That is to say, in the connection module 20 according to the present embodiment that is assembled to the power storage element stack 10 including the two (plurality of) power storage element arrays (12A, 12B), the displacement between the power storage element arrays in the direction where the power storage elements are arranged can be absorbed.

In this case, the angle adjusting part 27 is formed by the flexible rib 27A and the second hinge linking part 27B that are formed to be integrated with the inter-array bus bar housing part 25, and therefore has a simple configuration.

Note that the angle adjusting part 27 does not necessarily have the configuration including the flexible rib 27A and the second hinge linking part 27B. For example, the second hinge linking part 27B may be omitted. In addition, the flexible rib 27A may be omitted from the angle adjusting part 27. Furthermore, the angle adjusting part 27 may not be integrated with the inter-array bus bar housing part 25.

Other Embodiments

The technology described herein is not limited to the embodiment described above and with reference to the drawings. The following embodiments may be included in the technical scope.

(1) In the above embodiment, the grip part 29 provided at the right end of the connection module 20 in the arrow-X direction includes the wall part that forms the routing groove and the lid part that covers the routing groove. However, the configuration is not limited to this example. In another example, the grip part 28 provided at the left end may include the wall part that forms the routing groove and the lid part that covers the routing groove. In still another example, both grip parts (28, 29) may include the wall part that forms the routing groove and the lid part that covers the routing groove.

The grip parts (28, 29) are not necessarily provided at both ends in the arrow-X direction in FIG. 4.

The invention claimed is:

1. A connection module to be assembled to a power storage element stack including a plurality of power storage element arrays in each of which power storage elements each including positive electrodes and negative electrodes are arranged, the connection module comprising:
   a plurality of bus bars that electrically connects the electrode terminals between the power storage elements that are adjacent in each of the power storage element arrays;
   a plurality of bus bar housing parts each housing each of the bus bars;
   a plurality of first hinge linking parts that links the bus bar housing parts in a direction where the power storage elements are arranged, and expands and contracts in the direction where the power storage elements are arranged;
   a plurality of inter-array bus bars that electrically connects an electrode terminal of one power storage element array and an electrode terminal of another power storage element array;
   a plurality of inter-array bus bar housing parts each housing each of the inter-array bus bars; and
   an angle adjusting part adjusting an inclination angle of each of the inter-array bus bar housing parts from a direction perpendicular to the direction where the power storage elements are arranged in a plan view.

2. The connection module according to claim 1, wherein the angle adjusting part includes a plurality of flexible ribs coupling the bus bar housing parts and the inter-array bus bar housing parts in the direction perpendicular to the direction where the power storage elements are arranged, or coupling one inter-array bus bar housing part and another inter-array bus bar housing part in the direction perpendicular to the direction where the power storage elements are arranged.

3. The connection module according to claim 2, wherein each of the flexible ribs is provided at a position corresponding to a virtual line connecting the electrode terminal of the positive electrode and the electrode terminal of the negative electrode in one of the power storage elements.

4. The connection module according to claim 2, wherein the angle adjusting part further includes a plurality of second hinge linking parts that alternately links one end and another end of two adjacent inter-array bus bar housing parts in the direction perpendicular to the direction where the power storage elements are arranged.

5. The connection module according to claim 1, further comprising grip parts that are provided at both ends in the direction where the power storage elements are arranged and that grip the connection module to expand and contract the first hinge linking parts and adjust the angle adjusting part.

6. The connection module according to claim 5, further comprising rigid parts that are provided at both ends in the direction where the power storage elements are arranged, that include the grip parts, and that transmit an expansion and contraction force to the first hinge linking parts.

7. The connection module according to claim 5, wherein at least a grip part on one end includes:
- a wall part that forms a routing groove routing a detection line that detects a state of the power storage elements; and
- a lid part that covers the routing groove.

8. The connection module according to claim 2, further comprising a flexible linking rib that links two adjacent flexible ribs.

9. The connection module according to claim 1, wherein the angle adjusting part is formed to be integrated with each of the inter-array bus bar housing parts.

* * * * *